(12) United States Patent
Auclair

(10) Patent No.: US 6,734,355 B1
(45) Date of Patent: May 11, 2004

(54) GROUND CONNECTOR

(75) Inventor: John W. Auclair, Norfolk, CT (US)

(73) Assignee: Electric Motion Company, Inc., Winsted, CT (US)

( * ) Notice: Subject to any disclaimer, the term of this patent is extended or adjusted under 35 U.S.C. 154(b) by 0 days.

(21) Appl. No.: 10/359,855

(22) Filed: Feb. 7, 2003

(51) Int. Cl.[7] .................... H02G 15/00; H01R 4/66
(52) U.S. Cl. .................... 174/51; 174/135; 174/78; 439/98; 439/52; 439/778
(58) Field of Search .................. 174/51, 50, 48, 174/59, 68.1, 135, 78, 72 A; 439/98, 52, 100, 118, 778, 779, 92, 814, 907, 810, 811, 812, 813

(56) References Cited

U.S. PATENT DOCUMENTS

| | | | | |
|---|---|---|---|---|
| 4,325,598 A | * | 4/1982 | Leonardo | 439/98 |
| 4,806,108 A | * | 2/1989 | Meinhardt | 439/814 |
| 4,842,530 A | * | 6/1989 | Erickson et al. | 439/98 |
| 4,882,647 A | * | 11/1989 | Collins | 174/51 |
| 5,055,056 A | * | 10/1991 | Auclair et al. | 439/98 |
| 5,364,281 A | * | 11/1994 | Leto | 439/100 |
| 5,429,532 A | * | 7/1995 | Auclair, John W. | 439/98 |
| 5,679,032 A | * | 10/1997 | Auclair | 439/812 |
| 5,823,804 A | * | 10/1998 | Auclair | 439/98 |
| 5,954,547 A | * | 9/1999 | Auclair | 439/812 |
| D459,302 S | * | 6/2002 | Mailn | D13/133 |

* cited by examiner

*Primary Examiner*—Dean Reichard
*Assistant Examiner*—Angel R. Estrada
(74) *Attorney, Agent, or Firm*—Alix, Yale & Ristas, LLP

(57) ABSTRACT

A ground connector implemented as a modified lug on a flexible ground lead allows the convenient termination of a solid ground wire at a cable shield ground clamp. The ground wire and ground clamp are electrically and mechanically attached at the modified lug. The flexible ground lead carries the combined ground connection to a common ground point within an enclosure.

7 Claims, 6 Drawing Sheets

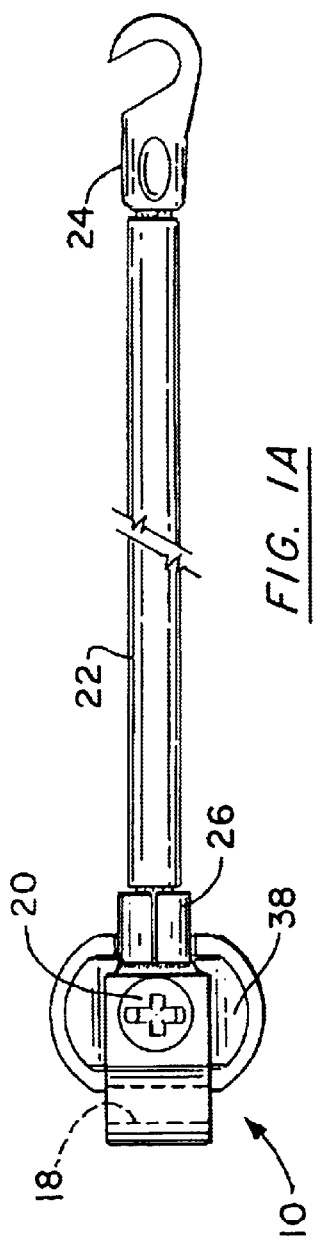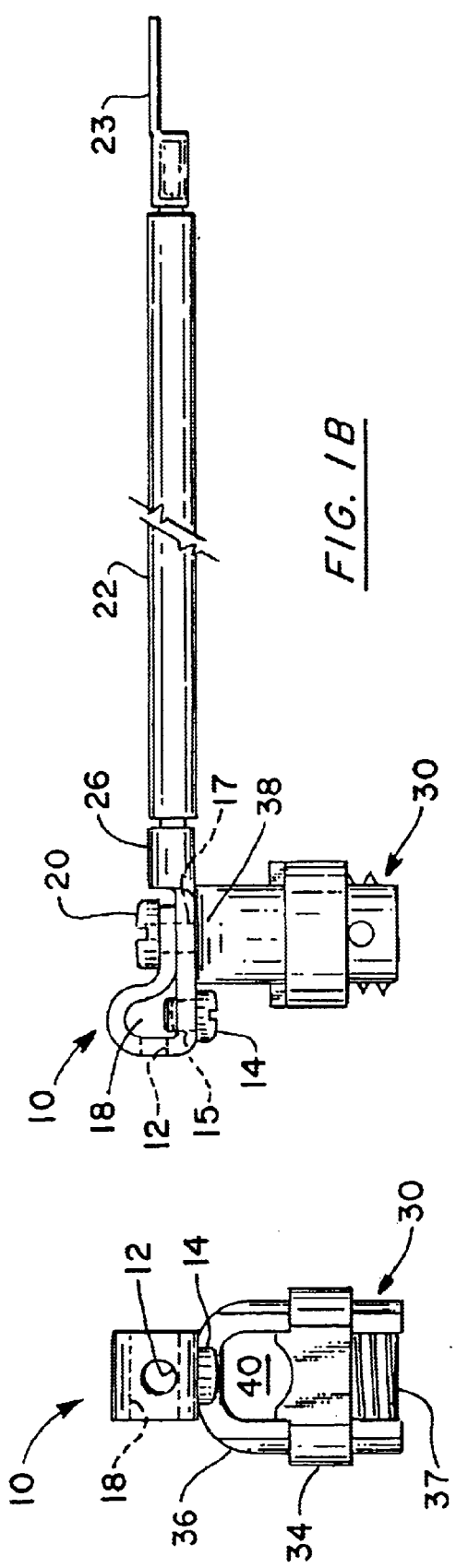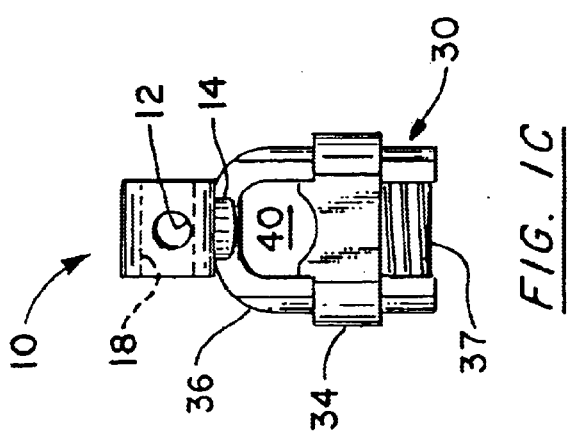

GROUND CONNECTOR

BACKGROUND OF THE INVENTION

1. Field of the Invention

This invention relates generally to devices for implementing a ground connection and, more particularly, to a ground connector for terminating heavy gauge solid ground wire at a cable shield ground clamp.

2. Description of the Related Art

A number of devices have been employed for connecting the tubular ground shield of service wires to a common ground point. Most conventional devices employ clamp assemblies of various forms. In applications to which the present invention relates, the ground connection devices are positioned within a cabinet or housing which may hereafter be referred to as a network interface device (NID). A NID is typically a weather-resistant, rigid plastic housing that may be mounted to a telephone pole or on the outside of a home. The NID receives service wires and includes connection terminals for linking a network to inside wiring. The buried service wires are typically comprised of multiple, concentric, protective layers surrounding several pairs of signal-carrying wires. The outer layer of a service wire is typically a heavyweight, flexible rubber or plastic, referred to as a jacket or sheath. Inside the jacket is typically arranged a tube-like metallic ground shield. Within the ground shield there may be another layer or layers of plastic or rubber surrounding and protecting the signal wires, otherwise known as pairs.

The NID is typically mounted to a pole or on the outside of a home and the service wire arranged to enter the cabinet through one of several grommet-covered entry openings. The NID is typically mounted so that the entry openings are directed downwardly. After passing through the rubber or elastic grommet, the ground shield of the service wire must be connected to a common ground point within the NID. U.S. Pat. No. 5,597,314 (hereinafter the '314 patent), assigned to the assignee of the present invention, discloses a cable-shield ground clamp for implementing such a ground connection. The cable shield ground clamp comprises a generally U-shaped yoke whose generally parallel legs define a service-cable-receiving aperture. The legs of the yoke have opposed, threaded surfaces. A keeper is threadable with the legs of the yoke and torquable for displacement relative to the yoke. The keeper includes a clamp jaw that is compressably engageable against the ground shield of a service wire received in the aperture. The yoke includes a screw or other means for connecting an end portion of the yoke to a flexible ground lead for implementing the ground connection with a common ground point.

U.S. Pat. Nos. 5,722,840 and 6,322,378, both assigned to the assignee of the present invention, disclose trough-like, rigid pair protectors which are configured to substantially surround the signal pairs when inserted within the ground shield of a service wire. The service wire and received pair protector are then received in the aperture of the '314 cable shield ground clamp. This arrangement allows the ground clamp to be torqued such that a reliable and secure ground connection is developed between the clamp and the cable ground shield without damaging the conductor pairs. The pair protector is sufficiently rigid to withstand pressure from the jaw of the ground clamp and protect the signal pairs within. The pair protector may be of particular utility when the signal wires are optical fibers and prone to crushing or other damage. Further, the pair protector disclosed in U.S. Pat. No. 6,322,378 discloses a conductive extension that projects an electrical connection with the shield to a point outside the cable jacket, obviating the need to remove the cable jacket and improving the strength of the assembled service wire and clamp.

The ground clamp is installed to the service cable after the service cable has passed through a grommet leading into the enclosure or NID. Many modern enclosures or NIDs are manufactured from molded plastics or other engineering materials that are substantially nonconductive. It, therefore, is necessary to implement a ground connection to a common network ground point within the enclosure to protect against lightning strikes and provide for noise suppression, etc., as is known in the art. Frequently, the ground connection enters the enclosure in the form of a heavy-gauge, solid copper or aluminum wire along a path parallel to the buried service wire. It may be difficult to establish a reliable connection between such a heavy-gauge, solid wire and the common ground point in the enclosure or NID. This is due to the limited space inside the enclosure or NID and the fact that the hardware inside the NID is often not compatible with the size and rigidity of such a solid ground wire.

There is a need in the art for a compact, efficient and reliable means for connecting a heavy-gauge, solid ground wire to a common ground point within a NID.

SUMMARY OF THE INVENTION

Briefly stated, the invention comprises a lug configured for permanent fixture to a flexible, stranded ground lead where the lug is modified to receive and secure one end of a predetermined gauge, solid ground wire. The modified lug is further configured to secure to the upper cap or end portion of the yoke of a cable shield ground connector as described in the '314 patent. A service wire and solid ground wire may thus be terminated immediately inside a NID and the ground connection for both carried to a common ground point by the flexible ground lead. The flexible ground lead may be pre-installed in the NID.

An object of the present invention is to provide a new and improved means of grounding a network interface device.

Another object of the present invention is to provide a new and improved connector for a solid ground wire entering a NID of space-efficient design.

A further object of the present invention is to provide a new and improved means of establishing a connection between a solid ground wire entering a NID and the NID circuitry that minimizes installation steps.

BRIEF DESCRIPTION OF THE DRAWINGS

These and other objects, features and advantages of the invention will become readily apparent to those of skill in the art upon reading the description of the preferred embodiments, in conjunction with the accompanying drawings in which:

FIGS. 1A–1C are top, side and left-end views of a ground connector of the present invention in combination with a known cable shield ground clamp;

DETAILED DESCRIPTION OF THE PREFERRED EMBODIMENT

Figure 2:
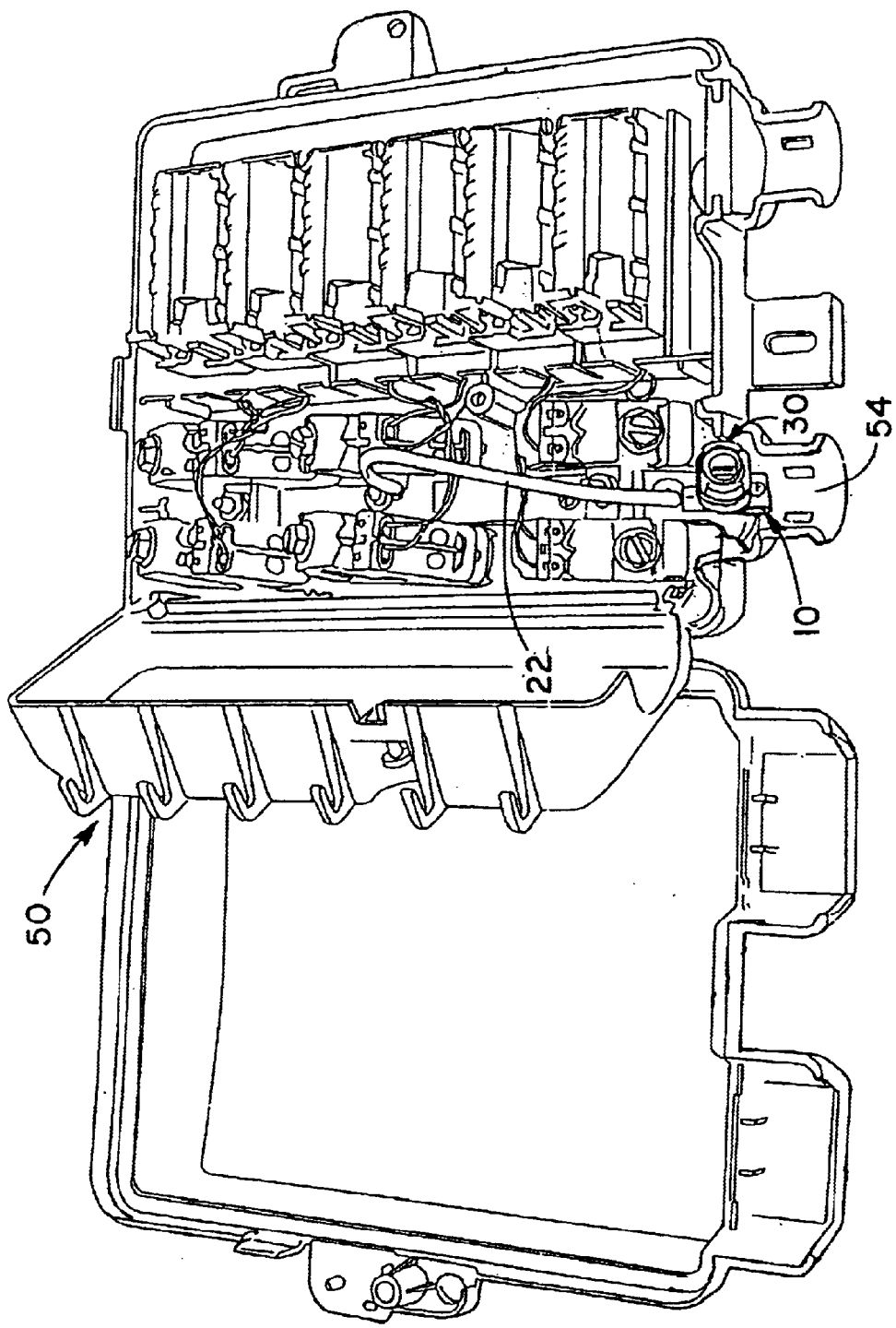
FIG. 2 is a perspective view of a network interface device and a partially installed ground connector/cable shield ground clamp combination as illustrated in FIGS. 1A–1C.

A preferred embodiment of the ground connector 10 will now be described with reference to FIGS. 1A to 1C. The ground connector 10 comprises a modified lug at one end of a flexible ground lead 22. The flexible ground lead 22 terminates in a hook terminal 24 for connection to a ground stud within a NID 50. The illustrated embodiment of a ground connector 10 comprises a heavy-gauge, bent metal strip where one end of the strip bends back over the middle of the strip, and a through hole 17 permits the ground connector 10 to be secured to the closed end portion 38 of the yoke of a cable shield ground clamp 30 by a screw 20. This configuration could also be described as a reverse fold having a D-shaped profile and defining a transverse cavity 18. The flexible ground lead 22 is secured at 26 to the ground connector 10 by means of laterally extended portions of the heavy-gauge sheet metal ground connector material being wrapped around and crimped to the stranded ground lead 22. This connection 26 may be implemented or supplemented by a solder connection as is known in the art.

Opposed to the ground connector attachment 26 to the ground lead 22, the bent portion of the ground connector 10 defines a transverse space 18. A threaded set-screw aperture 15 is arranged to intersect the space 18. The set-screw aperture 15 receives a set screw 14. An unthreaded ground wire bore 12 passes through the folded end of the ground connector 10, generally perpendicular to both the setscrew aperture 15 and the transverse space 18. The ground wire bore 12 is configured to closely receive a solid ground wire 60 having a particular gage. In the illustrated embodiment, the ground wire bore 12 is configured for a No. 10 AWG solid wire. The set-screw 14 is of sufficient length to pass through the set-screw aperture 15 into the transverse space 18 defined by bent end of the ground connector 10 and engage the ground wire 60 to bind the ground wire 60 to the ground connector 10. The set-screw 14 is preferably short so that it does not interfere with a service wire 70 being laid into the yoke of a cable shield ground clamp 30 when the ground connector 10 is fixed to the yoke of the cable shield ground clamp.

Figure 5:
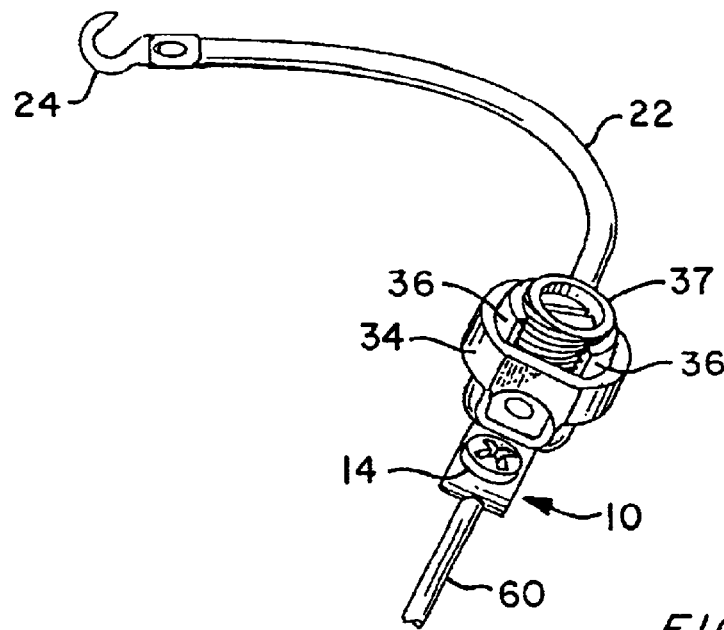
FIG. 5 is a perspective view of a ground connector/cable shield ground clamp combination with a ground wire fixed to the ground connector in accordance with the present invention.

As best seen in FIG. 5, the configuration of the ground connector 10, provides ready access to the set screw 14 and the driver 37 of the cable shield ground clamp 30 from the same direction when the ground connector 10 is fixed to the cable shield ground clamp 30. The importance of access to both these screws (14, 37) during installation as a convenience for the technician installing the ground connector 10 and cable shield ground clamp 30 will become more apparent upon reading the following description of the installation process.

Figure 3:
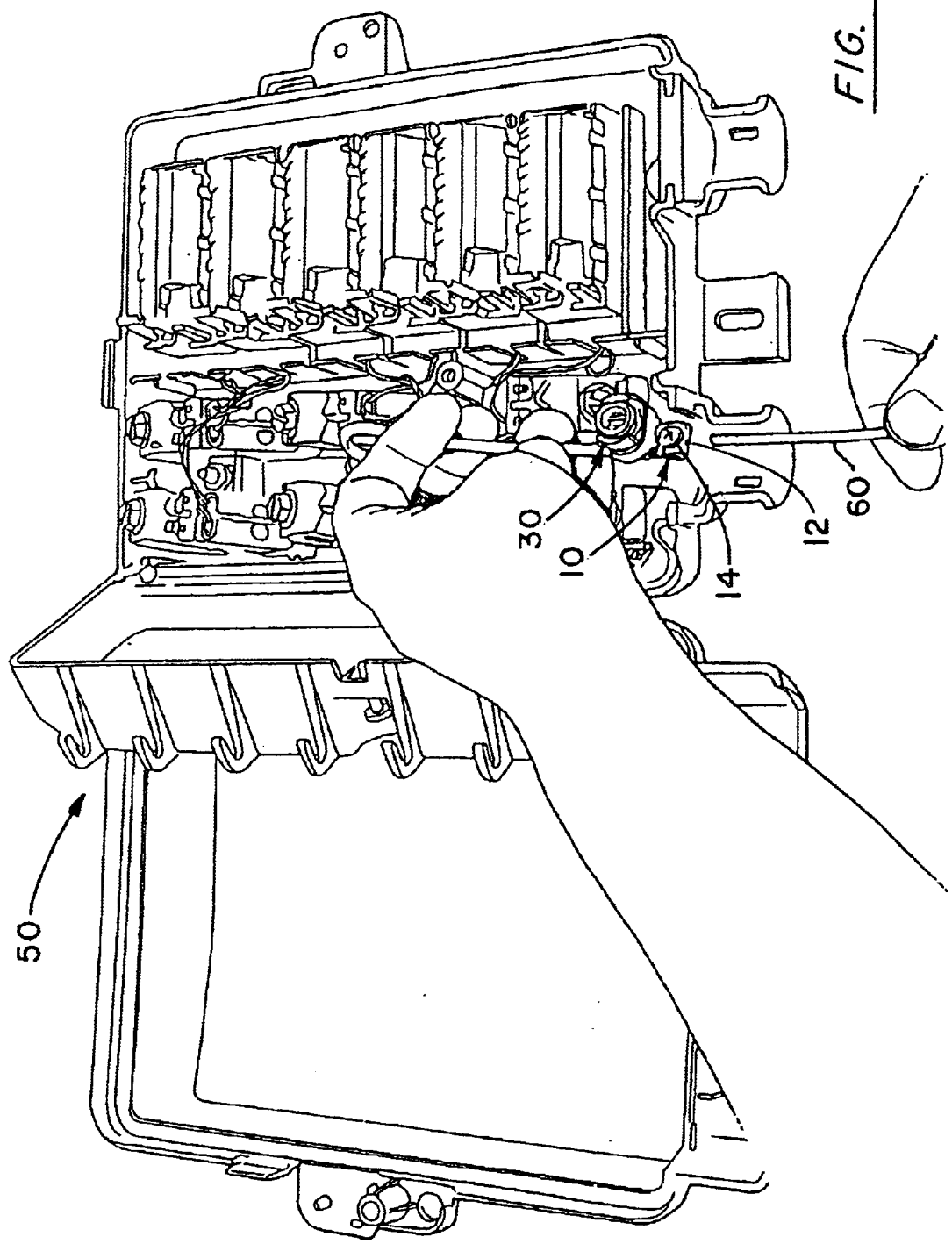
FIG. 3 is the perspective view of FIG. 2 further illustrating a technician attaching a ground wire to the ground connector in accordance with the present invention.
Figure 4:
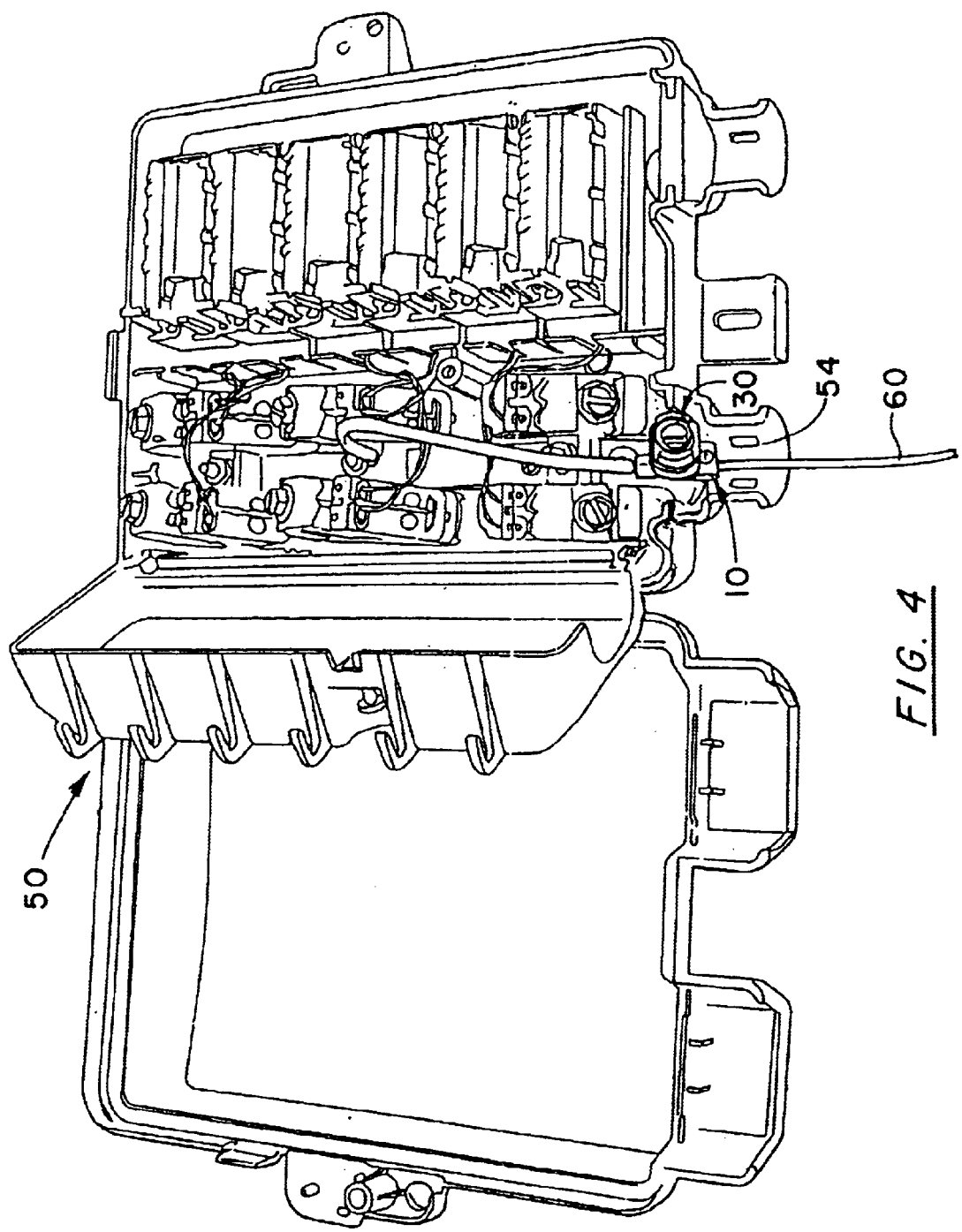
FIG. 4 is the perspective view of FIGS. 2 and 3 with the ground wire fixed to the ground connector in accordance with the present invention.

FIGS. 2–4 illustrate a typical NID 50 to which the invention relates. In FIG. 2, the NID 50 is illustrated in an open configuration with a cable shield ground clamp 30 attached to a ground connector 10 and flexible ground lead 22 in accordance with an aspect of the present invention. The hook connector 24 of the ground lead 22 is secured to a ground stud 52 in the NID 50. FIG. 3 illustrates a technician inserting a solid ground wire 60 into the ground wire bore 12 in the ground connector 10 to establish a ground connection between the NID 50 and an earth ground for lightning protection, etc. The set screw 14 is tightened, forming a connection between the solid ground wire and the ground connector as shown in FIG. 4. Note that both the cable shield ground clamp driver 37 and the ground connector set screw 14 are accessible from the same direction.

Figure 6:
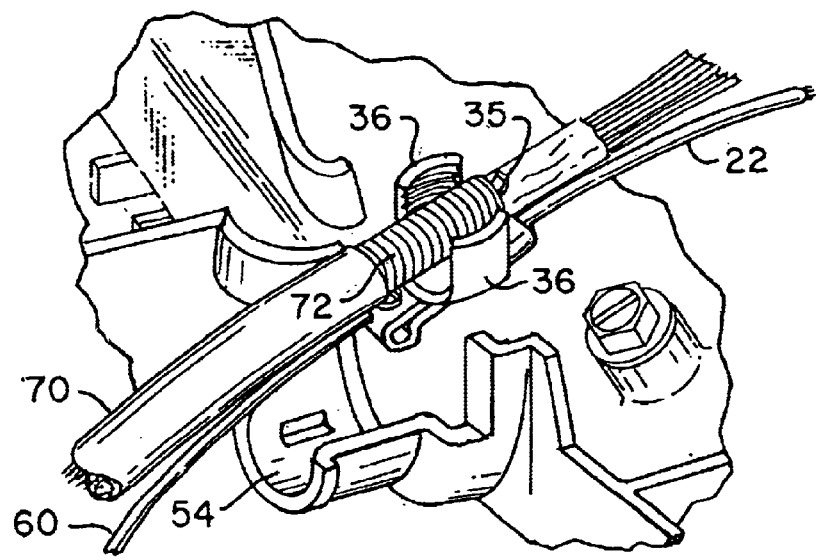
FIG. 6 is a partial perspective view of a NID, service wire, ground wire and ground connector/cable shield ground clamp showing the service wire being laid into the receiving aperture of the cable shield ground clamp in accordance with an aspect of the present invention.
Figure 7:
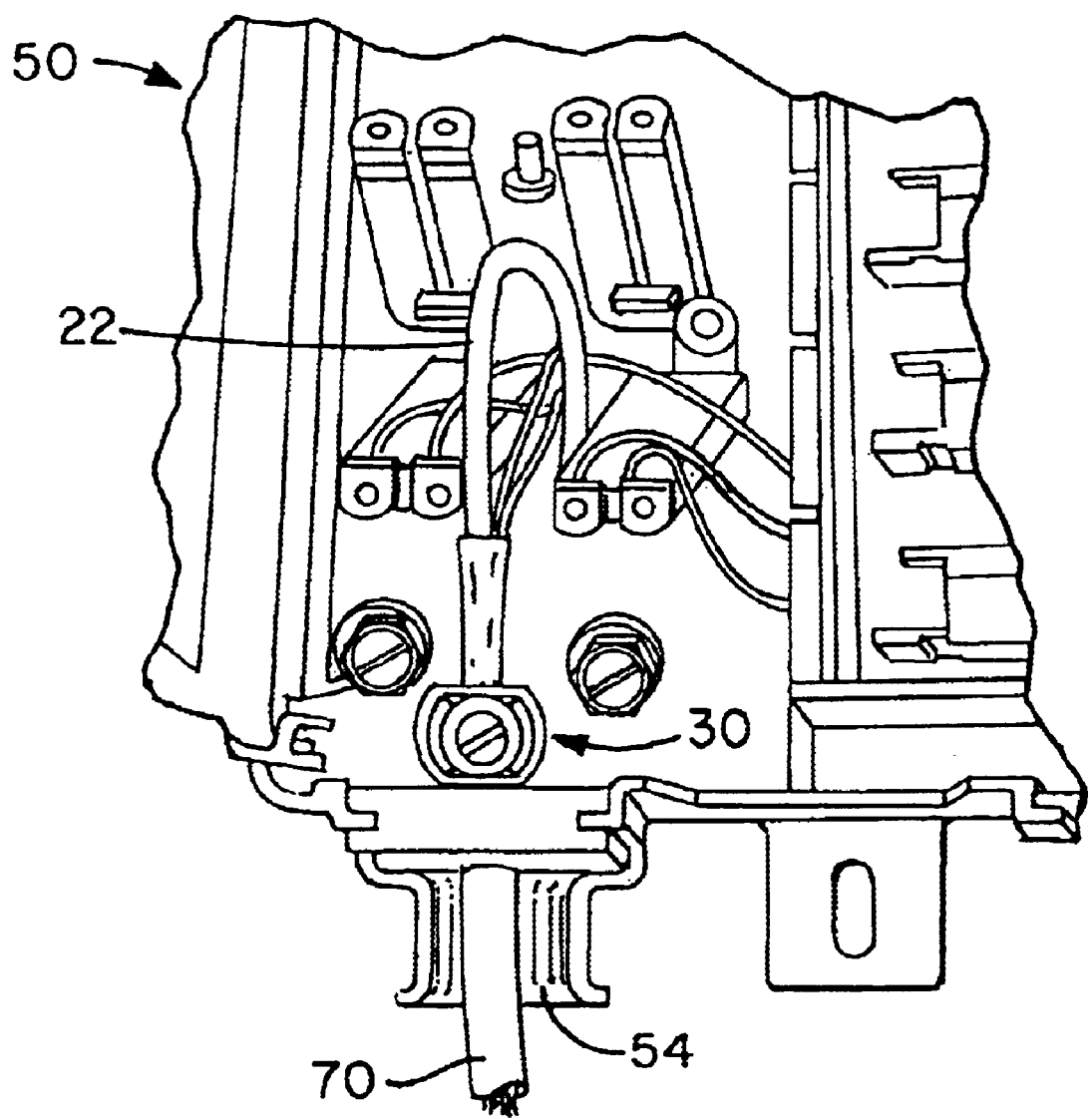
FIG. 7 is a partial perspective view of a NID with a fully installed ground connector/cable shield ground clamp and associated service wire prior to closing the NID.

The driver 37 and its attached clamp jaw 34 are removed from the yoke of the cable shield ground clamp 30. A service wire 70 with a portion of the jacket removed to expose the metallic ground shield 72 and with a pair protector 35 inserted may then be laid into the open receiving aperture 40 of the yoke as shown in FIG. 6. The driver/jaw 37, 34 (otherwise referred to as the keeper) is threadably engaged with the legs 36 of the yoke and tightened to establish a secure, grounded connection between the metallic shield 72 and the ground clamp 30. FIG. 7 illustrates a service cable 70 entering a NID 50 through an opening 54 covered with a grommet. The ground wire 60 parallel to the service cable 70 cannot be seen in this view. Immediately inside the grommet, the service cable 70 and ground wire 60 are terminated as well as mechanically and electrically connected using a ground connector 10/cable shield ground clamp 30 combination in accordance with the present invention. The flexible ground lead 22 is easily attached to a ground stud inside the NID 50 by its hook connector 24.

Thus, in accordance with the present invention, a secure and reliable ground connection is established between a solid ground wire 60 and the ground shield of a service wire 70 immediately inside a NID in a compact and efficient manner. The ground connector 10 occupies very little space inside the NID. The ground connector 10 is configured such that the installation process is simple and convenient for the technician.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A ground connector comprising:
    a flexible ground lead having a first end and a second end;
    an electrical connector fixed to the first end of the ground lead;
    a lug fixed to the second end of the ground lead, said lug comprising:
        a longitudinally extending electrically conductive body defining a longitudinal ground wire bore, a threaded set screw aperture partially traversing said body perpendicular to said ground wire bore and a fastener aperture traversing said body intermediate said ground lead and said ground wire bore, said fastener aperture generally parallel to said set screw aperture; and
        a set screw threadably engageable in said set screw aperture, wherein a ground wire is fixable to said lug by being inserted through said ground wire bore and compressively engaged by said set screw.

2. The ground connector of claim 1, wherein said ground lead comprises a length of insulated stranded wire.

3. The ground connector of claim 1, wherein said conductive body comprises a strip of metal having a reverse fold having a generally D-shaped profile defining a transverse cavity generally orthogonal to and communicating with both the set screw aperture and the ground wire bore.

4. The ground connector of claim 1, in combination with a cable shield ground clamp comprising:

- a generally U-shaped yoke having a pair of legs extending from an end connecting the legs to define a receiving aperture, said yoke further defining a threaded opening in the yoke end;
- a keeper comprising a driver and a clamp jaw, said driver being engageable with said legs for variable positioning of the jaw relative to the yoke and maintaining the position of said jaw relative to the yoke; and
- a fastener receivable through the fastener aperture of said ground connector to engage the threaded opening to provide a mechanical and electrical connection between said ground connector and said cable shield ground clamp.

5. In a cable shield ground clamp and ground lead connection, wherein the cable shield ground clamp comprises:

- a yoke that defines a U-shaped receiving aperture between a pair of legs extending in generally parallel relationship to each other from a yoke end portion connecting the legs, said end portion defining a threaded opening generally aligned with the receiving aperture;
- a keeper comprising a driver and a clamp jaw, said driver being engageable with said legs for variable positioning of the jaw relative to the yoke and maintaining the position of the jaw relative to the yoke;

wherein the ground connection comprises:

- a flexible ground lead having a first end and a second end;
- an electrical connector fixed to the first end of the ground lead;
- a lug fixed to the second end of the ground lead, said lug having a body defining a fastener aperture; and
- a fastener passing through said fastener aperture to engage the yoke end portion threaded opening to provide a mechanical and electrical connection between the ground lead and the cable shield ground clamp, wherein the improvement comprises:

- an extension of said lug body opposite the ground lead second end, said extension defining a ground wire bore configured to receive a ground wire end and a threaded set screw opening perpendicular to and communicating with said bore; and
- a set screw threadably receivable in said set screw opening and rotatable to compressively engage the ground wire end in said ground wire bore to mechanically secure the ground wire to the extension, whereby an electrical connection is established between the ground wire and the cable shield ground clamp.

6. The improvement of claim 5, wherein said ground wire is a solid wire having a gage and said ground wire bore is sized to closely receive the end of said solid wire.

7. The improvement of claim 5, wherein said lug and extension are formed from a strip of metal having a reverse fold with a generally D-shaped profile defining a transverse cavity generally orthogonal to and communicating with both the set screw opening and the ground wire bore.

\* \* \* \* \*